June 16, 1964 N. J. OSBORN ETAL 3,137,053
CLAMP FOR TUBING
Original Filed Jan. 6, 1958 3 Sheets-Sheet 1
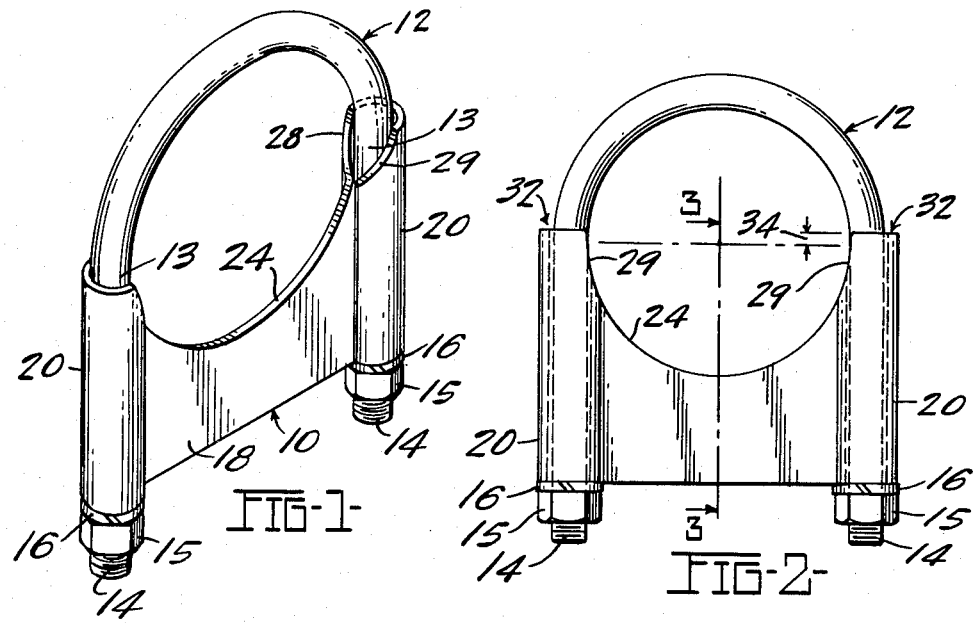
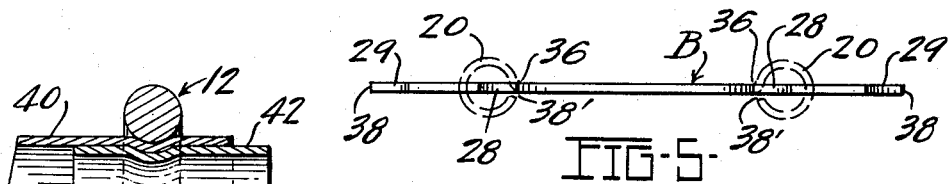
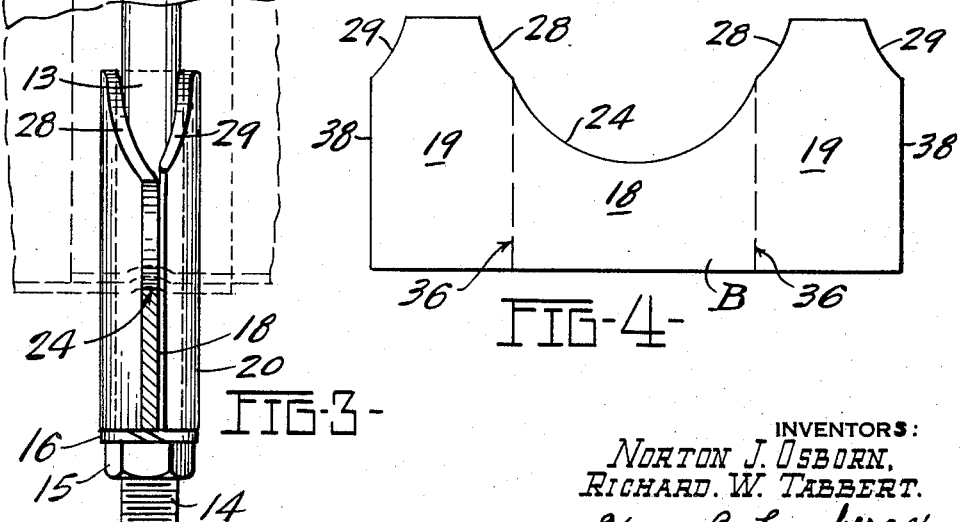
INVENTORS:
NORTON J. OSBORN,
RICHARD. W. TABBERT.
BY Harry O. Ernsberger
ATTORNEY

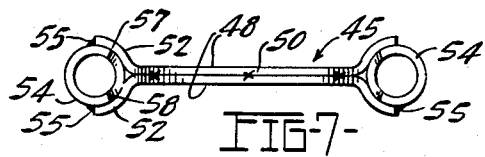
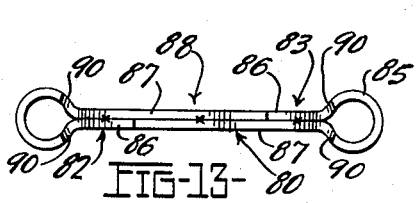
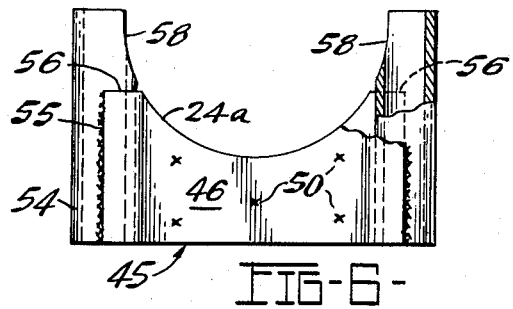
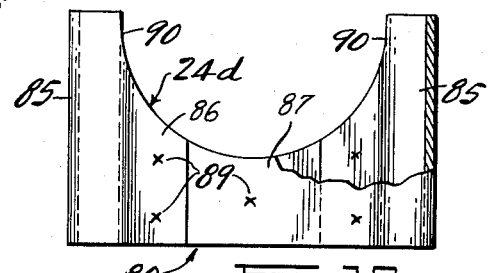
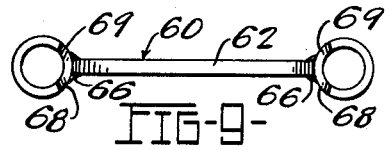
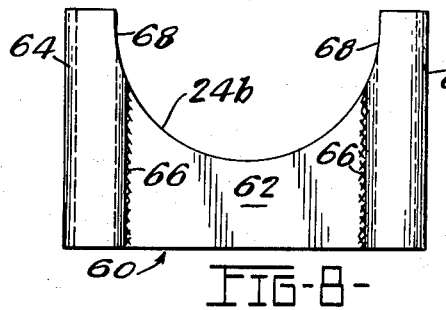
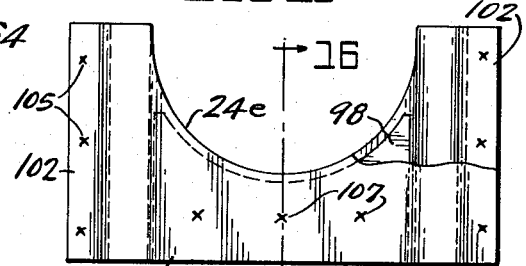
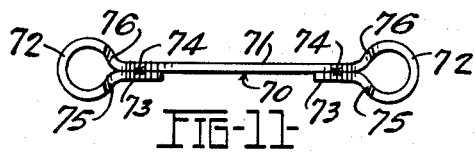
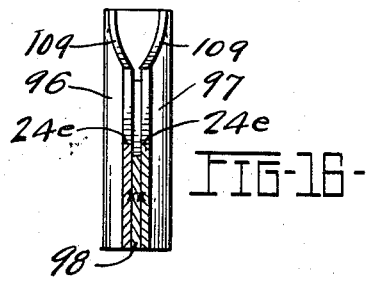
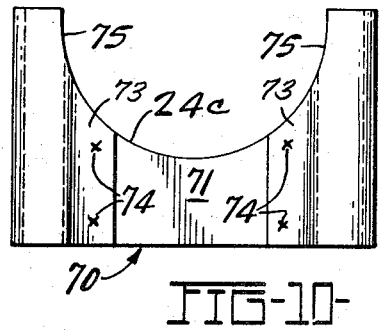

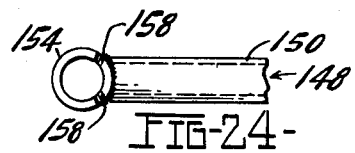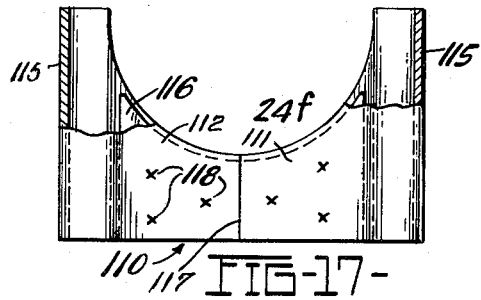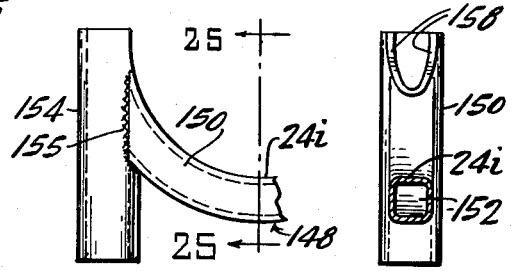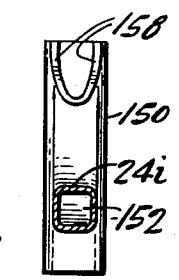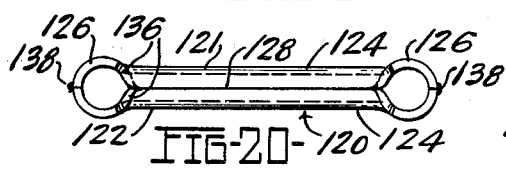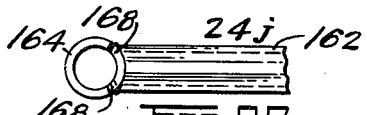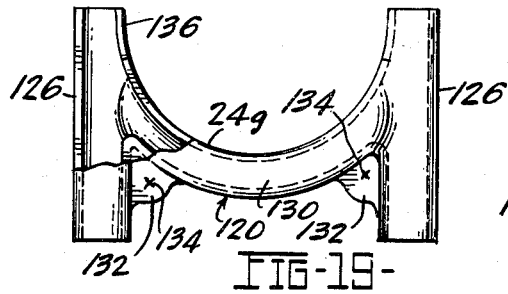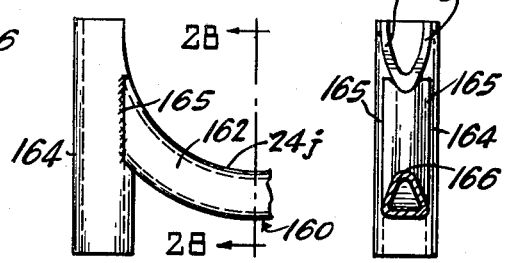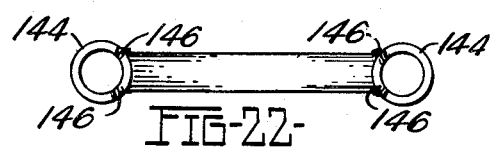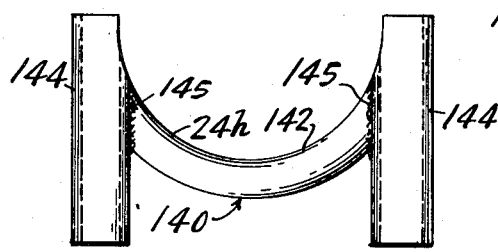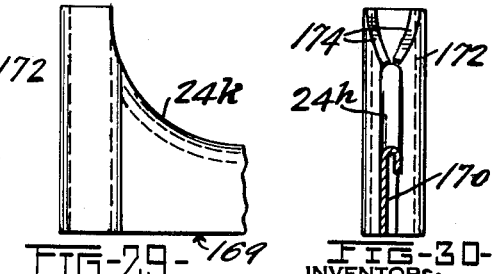

United States Patent Office 3,137,053
Patented June 16, 1964

3,137,053
CLAMP FOR TUBING
Norton J. Osborn and Richard W. Tabbert, Toledo, Ohio, assignors to The A P Parts Corporation, Toledo, Ohio, a corporation of Ohio
Original application Jan. 6, 1958, Ser. No. 707,237. Divided and this application Aug. 14, 1961, Ser. No. 131,371
2 Claims. (Cl. 24—277)

This invention relates to clamps for tubing, and more especially to improvements in a type of clamp generally referred to as a U-clamp or saddle clamp of a character employed for retaining sections of tubing in telescoped relation or for securing flexible hose or tubing onto a pipe or nipple, or wherever it is desired to clamp a hollow member of circular cross-section into engagement with a member telescoped therewith. This is a division of our copending application, Serial Number 707,237, now abandoned.

A conventional type of U-clamp includes a semicircular base or saddle member and a U-shaped bolt, the threaded legs of the bolt extending through openings in the base member, the threaded legs of the bolt adapted to receive securing nuts which are drawn up against the base member to clamp an outer tube in telescoped relation with an inner tube. In order for the U-clamp and base or saddle member to fit over the exterior of an outer tube, neither the curvature of the U-portion of the clamping bolt or the semicircular region of the base member can comprise more than 180° of an arc of a radius equal to the exterior diameter of the outer tube.

When the conventional U-clamp and base member are drawn into clamping engagement with an outer tube, they may be drawn to form a complete circle which appears to be substantially coincident with the periphery of the outer tube but, when drawn into final position or clamping position, there is no pressure exerted along the diameter of the open regions of the U-clamp and base member effective to squeeze or distort the outer tube inwardly at the sides of the clamp to obtain a sealing engagement. Thus there remain two diametrically opposite regions at the terminae of the base member and diametrically of the outer tube at which a seal is not effected and fluid may readily escape from or enter into the tubes at their overlapping regions which are not perfectly sealed one with the other. Clamps of this character are commonly used for clamping exhaust pipes or tail pipes with muffler arrangements utilized in exhaust systems of internal combustion engines. Substantial exhaust pressure is existent within the muffler and the exhaust and tail pipes and a clamping means which does not effect a gas tight seal throughout the entire periphery of the telescoped tubes permits exhaust gases from the interior of the muffler or tubes to escape through the imperfect or improperly sealed joints provided by conventional clamp constructions.

The present invention has for an object the provision of improved clamp means particularly usable with telescoped tubes or sections of tubing or other tubular constructions which may be drawn into sealing engagement and which will provide an effective seal throughout the entire circumferences of the telescoped members.

Another object of the invention is the provision of a U-clamp and saddle or base member construction wherein tubular configurations of the saddle surrounding the legs of the U-bolt and the portion or portions of the base member joining the tubular configurations are shaped or configurated to cooperate with the semicircular shape of the U-clamp to provide an effective seal wherein clamping pressure is effective throughout the entire circumference of the outermost member forcing the latter into sealing engagement with a second member telescoped therewith.

A further object of the invention is the provision of a clamping means of this character which may be manufactured economically in large quantities from sheet metal or fabricated from sheet metal and tubular components for assembly with a U-shaped bolt.

Further objects and advantages are within the scope of this invention such as relate to the arrangements, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an isometric view of a clamp construction embodying a form of the invention;

FIGURE 2 is a front elevational view of the arrangement shown in FIGURE 1;

FIGURE 3 is an enlarged sectional view taken substantially on the line 3—3 of FIGURE 2;

FIGURE 4 is a plan view of a sheet metal blank utilized in forming the saddle or base member of the construction shown in FIGURES 1 through 3;

FIGURE 5 is a schematic view illustrating the formation of the blank shown in FIGURE 4 to the configuration of the saddle or base member of the clamp construction;

FIGURE 6 is an elevational view of a modified form of saddle;

FIGURE 7 is a top plan view of the construction shown in FIGURE 6;

FIGURE 8 is an elevational view of another form of saddle clamp member or component;

FIGURE 9 is a top plan view of the construction shown in FIGURE 8;

FIGURE 10 is an elevational view showing another form of saddle component;

FIGURE 11 is a top plan view of the construction shown in FIGURE 10;

FIGURE 12 is an elevational view of another form of saddle construction fashioned of two elements;

FIGURE 13 is a top plan view of the arrangement shown in FIGURE 12;

FIGURE 14 is an elevational view showing a form of saddle construction fashioned of three elements;

FIGURE 15 is a top plan view of the construction illustrated in FIGURE 14;

FIGURE 16 is a sectional view taken substantially on the line 16—16 of FIGURE 14;

FIGURE 17 is an elevational view illustrating another form of saddle component fashioned of three elements;

FIGURE 18 is a top plan view of the construction shown in FIGURE 17;

FIGURE 19 is an elevational view illustrating a further form of saddle construction;

FIGURE 20 is a top plan view of the construction shown in FIGURE 19;

FIGURE 21 illustrates another form of saddle construction formed of two elements;

FIGURE 22 is a top plan view of the construction shown in FIGURE 21;

FIGURE 23 is a fragmentary elevational view illustrating a portion of a saddle member fashioned of three components;

FIGURE 24 is a top plan view of the arrangement shown in FIGURE 23;

FIGURE 25 is a sectional view taken substantially on the line 25—25 of FIGURE 23;

FIGURE 26 is a view similar to FIGURE 23 showing a modified form of saddle construction;

FIGURE 27 is a top plan view of the construction shown in FIGURE 26;

FIGURE 28 is a sectional view taken substantially on the line 28—28 of FIGURE 26;

FIGURE 29 is a view similar to FIGURE 26 illustrating another form of saddle component, and FIGURE 30 is a vertical sectional view taken substantially on the line 30—30 of FIGURE 29.

While the clamp construction of the invention is particularly adapted for clamping an exhaust pipe or a tail pipe with tubular extensions or fittings of a muffler for use in the exhaust gas system of an internal combustion engine, it is to be understood that the clamp construction may be utilized for clamping cylindrically shaped members into sealing engagement with members telescoped therein.

Referring to the drawings in detail and initially to the construction shown in FIGURES 1 through 3, the form of clamp construction illustrated therein is inclusive of a saddle or base member or component 10 and a U-shaped clamping bolt 12, the legs 13 of which are threaded as at 14 to receive clamping nuts 15. If desired, spring or lockwashers 16 may be interposed between the clamping nuts and the saddle component of the clamp construction. The saddle 10 is formed with a web or planar body portion 18 formed at its end regions with cylindrically shaped tubular portions 20 adapted to accommodate the parallel leg portions 13 of the U-bolt 12.

The clamp body or saddle body 18 is formed of a single sheet of metal, as for example, sheet steel and is fashioned with a curved edge 24 of semicircular shape forming a lip. The tubular configuration 20 at each end region of the web portion 18 is formed integrally with the web. The method of forming the saddle or body component of the clamp construction from a sheet of metal is illustrated in FIGURES 4 and 5. A flat blank B of sheet metal is stamped or cut to the configuration or shape shown in FIGURE 4 by suitable punching die.

The blank B is shaped to provide the central body or web portion 18 and end regions 19, the latter being formed during processing into the tubular configurations 20 shown in FIGURES 1, 2 and 3. Each region 19 of the blank B is formed at its upper portion with curved edge regions 28 and 29 which form diverging lips as shown in FIGURES 1 and 3 which are adapted to engage the exterior surface of an outermost tube or member in divergent regions.

It should be noted that the upper edges 32 of the tubular portions 20 shown in FIGURES 1, 2 and 3 extend above the horizontal diameter of the semicircular edge or lip 24 a slight distance as indicated at 34 in FIGURE 2 so that the upper portions of the divergent lips 28 and 29 are adapted for sealing engagement with the exterior surface of an outermost tubular member surrounded by the clamp at the region of the horizontal diameter of the curved edge or lip 24 as viewed in FIGURE 3.

In the formation of the blank B to the final configuration shown in FIGURE 1, the blank is bent along the lines 36 and the portions 19 of the blank formed into cylindrical shape providing the tubular portions 20 as shown in broken lines in FIGURE 5. It should be noted that the lateral edges 38 of the blank when fashioned into the tubular portions 20 are brought into the positions indicated at 38' in FIGURE 5 in contact or engagement with the web 18.

It is found by employing metal of proper thickness and strength that it is unnecessary to weld the edges 38 to the web, but they may be so welded if desired.

It should be noted from FIGURE 2 that the divergent edge surfaces 28 and 29 at the region indicated by 34 in FIGURE 2 are tangential to the arc or curvature of the saddle edge or lip 24.

FIGURE 3 is an enlarged view illustrative of the clamp construction as utilized for clamping two telescopically arranged tubes or tubular members 40 and 42 in sealing condition. In installing or using the clamp in the manner illustrated in FIGURE 3, the U-shaped bolt 12 with the saddle 20 removed is placed astraddle of the outermost tube 40, the curvature of the inner surface of the semicircularly shaped portion of the U-bolt 12 being of the same radius of curvature as the edge or lip 24 of the saddle 10, which curvature is substantially identical with the radius of the circular cylindrical exterior surface of the outermost tubular member 40.

The saddle 10 is then assembled with the U-clamp, the parallel leg portions 13 of the U-bolt extending through the tubes or tubular portions 20 of the saddle 10 to bring the curved edge or lip 24 into contact with the exterior surface of the outermost tube 40 as shown in FIGURE 3. The lockwashers 16 and the clamping nuts 15 are assembled on the threaded portions 14 of the legs 13 of the U-bolt and the nuts 15 drawn up so as to exert clamping pressure on the telescoped tubes.

To establish sealing engagement the nuts are drawn until the inner surface of the semicircular portion of the U-bolt 12 indents the exterior surface of the tube 40 and the lip 24 of the saddle body or web 18 indents the tube 40 in the manner illustrated in FIGURE 3.

The indentation or recessing of the tube 40 in a circular path defined by the inner surface of the circular portion of the U-bolt and the semicircular lip 24 of the saddle 18 causes corresponding indentation of the innermost tube 42 in the manner illustrated.

Concomitantly with the drawing up of the nuts 15 to attain this sealing engagement, the divergent lips or curved edge regions 28 and 29 are squeezed into engagement with the exterior surface of the tube 40 and indent the tube at the region of horizontal diameter of the clamp construction as viewed in FIGURE 2. Thus the lip portions 28 and 29, as viewed in FIGURE 2, become, in effect, continuations of the curvature 24 and, being squeezed into engagement with the side regions of the outermost tube 40 at the zone of overlap of the semicircular inner surface of U-bolt 12 with the divergent lips 28 and 29, establish a sealed engagement at this region by indenting the telescoped tubes in divergent paths coincident with the divergent lips 28 and 29.

Thus at the region indicated at 34 in FIGURE 2 and immediately below this region there is an overlap of the indentation established by the circular portion of the U-bolt 12 with the indentations established by pressure of the lips 28 and 29 into the outermost tube so that a sealing engagement is established by radial pressure throughout the entire periphery of the telescoped tubes.

Through the use of this construction, there are no open passageways between the outer wall of the inner tube 42 and the inner wall of the outer tube 40 through which gas or fluid may escape as both the inner and outer tubes are indented throughout the circumference of 360° to establish an effective seal at the indented regions of the tubes.

The saddle or component 10 of the clamp construction may be fashioned in various ways and, in certain of the forms or modifications, may be fashioned of more than one element and utilize the principles of the functioning of the construction shown in FIGURES 1 through 3. FIGURES 6 and 7 illustrate a modified form of saddle construction usable with a U-bolt 12 of the character shown in FIGURES 1 through 3. In the form of construction shown in FIGURES 6 and 7, the saddle component 45 is configurated with a central web or body portion 46.

The web or body portion 46 of the saddle is formed of two matched or mating elements 48 to form a web 46 of double thickness of metal, the elements 48 being welded in regions indicated at 50 to form an integrated web construction. The elements 48 are formed with curved extremities 52 shaped to fit the exterior surfaces of tubes 54, the tubes being fashioned as independent elements. The curved portions 52 of the elements 48 partially embrace the tubes 54 and are welded to the tubes as indicated at 55.

It will be noted from FIGURE 6 that the upper edge regions 56 of the web forming elements 48 terminate substantially below the upper ends of the tubes 54.

The upper regions of the tubes 54 are formed with convergent lips or lip portions 57 and 58 which are of substantially the same curvature as the lip portions 28 and 29 shown in FIGURE 3, and are adapted to snugly embrace the side regions of a tube to be clamped by the saddle and U-bolt construction. When the saddle and U-bolt are drawn up, the converging lip portions 57 and 58 indent the outermost tube of telescoped tubes to be clamped together in the same manner as the lips 28 and 29 of the construction shown in FIGURE 3, while the circular edge 24a of the web construction 46 engages and indents the outermost tube in the manner shown in FIGURE 3.

Thus the same principle of effecting a seal between telescoped tubes throughout the entire periphery of 360° of the tubes is effected through the construction shown in FIGURES 6 and 7. It should be noted that the tubes 54 may be cut from tubular stock to the required length and the curvature of the diverging lip portions 57 and 58 machined in the upper region of each of the tubes. Only one die is required to fashion the web elements 48 as they are of identical shape and construction, arranged in back-to-back relation and welded as indictted in FIGURE 7.

FIGURES 8 and 9 illustrate another form of saddle construction fashioned of three elements or components. The saddle construction 60 includes a central body or web 62 and identically shaped tubular members 64. The extremities of the central body or web 62 are welded to the exterior surfaces of the tubes 64 as indicated at 66 to form an integrated construction.

The upper regions of the tubes 64 are fashioned with lip portions 68 and 69 which form in effect, divergent continuations of the circular edge or lip 24b of the web or body 62. The saddle shown in FIGURES 8 and 9 is associated and used with a U-shaped bolt of the same character as shown at 12 in FIGURE 1, and the principles of sealing telescoped tubes through the use of the saddle 60 and U-bolt is the same as that of the other forms of saddle construction herein shown.

FIGURES 10 and 11 illustrate another form of one-piece saddle construction of a character similar to that illustrated in FIGURES 1 through 3. In the construction illustrated in FIGURES 10 and 11, the saddle 70 is formed of one sheet of metal configurated with a central body portion or web 71, tubular portions 72 and extensions 73 which are in contiguous relation with the central web portion 71 and are welded thereto as indicated at 74.

The web portion 71 is formed with curved edge or lip 24c of semicircular extent which cooperates with the diverging lip portions 75 and 76 which, when viewed in front elevation as in FIGURE 10, appear as continuations of the curvature 24c. The lip 24c and the diverging lips or regions 75 and 76 of the tubular portions 72 cooperate in the manner hereinbefore described in coneection with the construction shown in FIGURES 1, 2 and 3 for effectively establishing a seal between telescoped tubes. The construction shown in FIGURES 10 and 11 is assembled with the U-shaped bolt of the character shown at 12 in FIGURE 1 and accomplishes the same function as the arrangement shown in FIGURES 1 through 3.

FIGURES 12 and 13 illustrate a form of saddle 80 formed of two components or elements 82 and 83 of identical shape. Each of these elements is formed of sheet metal, such as sheet steel, with a tubular configuration 85, a comparatively short extension 86 and a longer extension 87. The extensions 86 and 87 of the respective elements are lapped upon each other in the manner illustrated in FIGURE 13 forming a web portion or central body portion 88 of a double thickness of metal.

It should be noted that in the pattern of overlap of the extensions 86 and 87, the end of the short extension 86 of one element abuts the end of the long extension 87 of the other element. The extensions 86 and 87 of the elements are welded together as indicated at 89. The central body portion 88 formed by the overlapping extensions is configurated with a semicircular curved edge forming a lip 24d and this curvature 24d blends with lips 90 which are of the same size and configuration as the lips 28 and 29 embodied in the form of the invention illustrated in FIGURE 1.

The saddle illustrated in FIGURES 12 and 13 is adapted for assembly and use with a U-bolt of the character illustrated at 12 in FIGURE 1. When the saddle 80 is drawn into engagement with telescoped tubes by means of the U-shaped bolt and securing nuts 14 in the manner shown in FIGURE 3, the semicircular edge region or lip 24d is caused to indent the outer tube, and the diverging lip portions 90 caused to be squeezed diametrically inwardly of the telescoped tubes to form a gas tight seal throughout the entire periphery of the telescoped tubes.

The peripheral indentations in the outermost of the telescoped tubes are formed by the cooperative relation of the semicircular portion of the U-bolt and the semicircular lip 24d, the indentations at the horizontal region of the telescoped tubes being caused by the inward squeezing or pressure on the diverging lips 90 overlapping the indentation caused by the diametrically opposed regions of the U-bolt at the juncture of the parallel leg portions of the bolt with the U-shaped portion thereof. The saddle arrangement shown at 80 in FIGURES 12 and 13 may be economically manufactured as they are of identical shape and size.

FIGURES 14 through 16 illustrate another form of saddle construction. In this form, the saddle 95 is formed of three components comprising two members 96 and 97 of identical shape and size and an intermediate element or component 98, the members and element being formed of sheet metal. Each of the members 96 and 97 is formed with a central planar web portion, longitudinally spaced semicylindrically shaped portions 100 and planar extensions 102.

Disposed between the central web portions of the members 96 and 97 is a spacing plate or element 98 which maintains the web portions of the elements in transversely spaced relation as illustrated in FIGURES 15 and 16. The central web portions of the members 96 and 97 and the planar extensions 102 are arranged in the manner shown in FIGURE 15 whereby the semicylindrically shaped portions 100 in mating relation form tubular regions 104 adapted to accommodate the parallel legs of a U-bolt of a type shown at 12 in FIGURE 1.

The mating end regions 102 are welded together by spot welding as indicated at 105 and the web portions of the members 96 and 97 are welded to the intermediate or spacing plate or element 98 as indicated at 107. The edge regions 24e of the web portions of both members 96 and 97 are of semicircular shape of identical contour, the upper region of the semicircular lips 24e terminating in diverging lips 109 provided on regions of the elements forming the tubular configurations 104.

In the arrangement shown in FIGURES 14 through 16, the lips or edge regions 24e of the members 96 and 97, when drawn into engagement with telescoped tubes by means of a U-bolt with which the saddle is assembled, the lip portions 24e indent dual parallel recesses circumferentially in the outermost of telescoped tubes to be sealed together and, the divergent lip portions 109, cause diverging indentations in the diametrically opposed horizontal regions of the telescoped tubes which, in effect, are continuations of the dual indentations established through pressure of the lips 24e.

The recesses in the outermost tube formed by the diverging lips 109 overlap the indentation in the outermost tube established by diametrically opposed regions of the U-shaped bolt when drawn into sealing engagement with the telescoped tubes. The saddle 95, through the provision of the transversely spaced parallel lips 24e, establishes dual recesses in the lower half of the telescoped tube arrangement which cooperates with the single indentation established in the upper half of the telescoped tubes by the pressure of the U-bolt so that the lips 109 are squeezed into the diametrically opposed side regions of the telescoped tubes to provide a fluid tight seal.

FIGURES 17 and 18 illustrate another form of saddle construction of the invention. In this form, the saddle 110 is formed of two identically shaped sheet metal elements or components 111 and 112 each of which is generally hairpin-like in shape. Each of the elements 111 and 112 is formed with spaced parallel planar or flat portions 114 which are integrally formed with a generally tubular configuration 115.

The portions 114 are spaced apart by means of a plate or spacer 116 of the contour or shape illustrated in FIGURE 17, the spacing plate 116 and the planar portions 114 of both elements 111 and 112 being in coincident relation as shown in FIGURE 18 with the extremities of the portions 114 abutting at the region indicated by the line 117 and welded into an integrated construction by means of spot welds 118. The tubular configurations 115 are of a diameter to accommodate the leg portions of a U-bolt 112 shown in FIGURE 1.

The portions 114 making up the web portions of the saddle construction are formed with semicircularly shaped edge portions 24f in the same manner as shown in FIGURE 14 to form dual lips similar to the lips 24e shown in FIGURE 16. The upper regions of the tubular portions 115 are formed with divergent lips 119 similar to the divergent lips 109 illustrated in FIGURE 16.

The transversely spaced lips 24f cooperate with the divergent lips 119 of the tubular portions 115 and the U-bolt with which the saddle is used to establish a fluid tight seal between telescopingly assembled tubes when the saddle 110 and the associated U-bolt are drawn into sealing engagement therewith.

The construction shown in FIGURES 17 and 18 may be economically produced as the components or elements 111 and 112 are of identical shape so that they may be formed on one set of dies.

FIGURES 19 and 20 illustrate another form of saddle construction, wherein the saddle 120 is formed of two identically shaped sheet metal stampings or sections 121 and 122. Each of these elements or sections is formed with a semiannularly shaped web portion 124 and semiannularly shaped end portions 126. The sections or elements 121 and 122 are adapted to be mated or assembled together as illustrated in FIGURE 20, the adjacent correspondingly shaped portions of the sections meeting at a juncture line or region 128 and are welded together along the juncture line 128 to form an integrated construction.

The portions of the sections 121 and 122 intermediate the tubular regions 126 are of curved configuration to form a connecting web or bridge 130 joining the portions 126. The web or bridge 130 is of hollow circular cross-section and the semicircular contour of the bridge or web 130 provides a lip 24g of semicircular shape and of a radius to fit the outermost of telescoped tubes with which the clamp is to be used.

The sections 121 and 122 may be formed with reinforcing mating flange portions 132 spot welded together as shown at 134. The upper innermost regions of the tubular portions 126 are formed with diverging lips 136 which are of the configuration of the lips 109 shown in FIGURE 16 and which engage diametrically opposed zones of the outermost of the telescoped tubes straddled by the saddle 120 as described in connection with other forms of the saddle construction.

The tubular portions 126 are adapted to receive the parallel legs of a U-clamp or U-bolt 12 shown in FIGURE 1 and the lips 24g and 136 are drawn into snug engagement by the U-clamp 12 and the nuts 14 to force the outermost of the telescoped tubes into sealing engagement with the innermost tube to form a fluid tight joint.

The semiannularly shaped portions 126 forming the tubes to receive the U-bolt may be welded along the juncture lines 138 to strengthen the tubular configuration. The arrangement of saddle shown in FIGURES 19 and 20 may be economically manufactured as a single forming die produces both sections 121 and 122 which are of identical shape and size.

FIGURES 21 and 22 illustrate a saddle formed of three elements or components. In this arrangement, the saddle 140 comprises a bridge or web 142 which may be fashioned as a solid rod or a tube of circular cross-section shaped to curved configuration providing a semicircular lip 24h, the same being the innermost region of the longitudinal curvature of the rod 142. Disposed adjacent each end of the curved bar or bridge member 142 are lengths of tubing 144 which are respectively welded to the ends of the curved bar or web 142 as at 145 to form an integrated construction.

The upper inner regions of the tubes 144 are formed with diverging lip portions 146 which function in the manner of the divergent lip portions 28 and 29 shown in FIGURE 1 arranged to exert lateral pressure upon diametrically opposite zones of the outermost of telescoped tubes with which the clamp or saddle construction may be used. The tubes 144 are of a length to accommodate the parallel leg portions of a U-shaped bolt 12 shown in FIGURE 1.

When the saddle 140 and U-bolt are assembled about telescoped tubes in the manner illustrated in FIGURE 3, the lip 24h provided by the bridge or web 142 cooperating with the divergent lips 146 on tubes 144 engage and indent the outermost of the telescoped tubes to affect a seal in the manner described in connection with other forms of the invention. The arrangement shown in FIGURES 21 and 22 may be economically manufactured as the central web or bridge 142 may be fashioned of conventional bar stock or tubing of circular cross-section and the tubes 144 severed to required lengths from tube stock.

FIGURES 23 through 25 illustrate a saddle construction 148 of a character similar to that shown in FIGURES 21 and 22. The saddle 148 is inclusive of a central web or bridge member 150 which is of substantially rectangular cross-section and having a hollow interior as at 152. The tubular portions 154 may be fashioned of lengths of tube stock welded to the extremities of the bridge or web 150 at the regions indicated at 155 to form an integrated construction.

The bridge or web 150 is of circular configuration and the inner curved surface region thereof forms a lip 24i for engagement with one half of the periphery of the outermost of telescoped tubes with which the clamp is to be used. The upper regions of the tubes 150 are fashioned or formed with diverging lips 158 which function in the manner or the lips 28 and 29 illustrated in FIGURE 1.

The curved lip 24i of the bridge or web 150, when drawn into engagement with the exterior surface of the outermost of telescoped tubes by the U-bolt, indents the tube and, together with the lateral pressure of the lip portions 158 indenting the side regions of the tube, establish an effective fluid tight seal throughout the entire peripheral regions of the telescoped tubes.

FIGURES 26 through 28 illustrate a modified form of the arrangement shown in FIGURES 23 through 25. In this form, the saddle construction 160 includes a central bridge or web portion 162 of generally triangular cross-section and of a hollow configuration as illustrated in FIGURE 28. The tubular portions 164 of the saddle are formed of lengths of standard tubing of the proper diameter, the tubular portions or tubes 164 being welded to the extremities of the triangularly shaped bridge member 162 along the juncture line 165.

The curved region of the apex of the triangular cross-section provides a lip 24j which is of semicircular shape adapted to coincide with the periphery of an outermost tube of telescoped tubes to be sealed together. The upper innermost regions of the tubes 164 are formed with diverging lips 168 which, in function, form a continuation of the lip 24j in the manner illustrated in FIGURE 28. The saddle 160 is adapted to be assembled and used with a U-bolt of the character shown in FIGURE 1.

When the U-bolt and saddle 160 are drawn into snug engagement with the outermost of the telescoped tubes in the manner illustrated in FIGURE 3, the lip 24j of the bridge or web 162 and the lips 168 pressed into the exterior peripheral regions of the outermost tube and the U-bolt pressed into engagement with the remaining region of the outermost tube, a gas or fluid tight seal is effected between the telescoped tubes.

FIGURES 29 and 30 illustrate another form of the construction shown in FIGURE 1. As shown in FIGURES 29 and 30, the saddle 169 is formed of a single sheet of metal and is inclusive of a central web 170 terminating in the end regions which are shaped in the manner shown in FIGURE 5 to provide tubular portions 172. The upper and innermost regions of the tubular portions 172 are configurated with diverging lips 174 which are identical with the lips 28 and 29 shown in FIGURE 1 and perform the same functions when pressed into engagement with the outermost of telescoped tubes.

The semicircular edge region of the connecting web 170 is rolled over or bent upon itself to provide a lip 24k which performs substantially the same function as the lip 24 shown in FIGURE 1.

In the form of construction shown in FIGURES 29 and 30, the lip 24k being of curved configuration in cross-section forms substantially a continuation of the curvature of the U-shaped portion of the U-bolt 12, shown in FIGURE 1, when used with the saddle 169 of FIGURES 29 and 30 so that the indentation or recess formed by the U-shaped portion of the U-bolt and the lip 24k will be of substantially the same cross-sectional curvature of indentation in the outermost of the telescoped tubes with which the clamp may be used.

The lip portions 174 form, in effect, divergent continuations of the lip 24k and function in the same manner as the construction shown in FIGURE 1 to form a fluid tight joint between telescoped tubes or members. The construction shown in FIGURES 29 and 30 is formed of a single sheet of metal configurated to substantially the same shape as the construction shown in FIGURE 1 but with the rolled or bent portion 24k forming the sealing lip.

It is to be understood that in all forms of the invention disclosed, the upper extremities of the tubes or tubular portions of the saddle constructions extend slightly above a horizontal diameter as indicated by numeral 34 in FIGURE 2 so that the regions of engagement of the divergent lips in all of the forms overlap to a slight extent the curvature of the U-shaped portion of the U-bolt at the region of transition to the parallel leg portions 13 as shown in FIGURE 1 so that the divergent lips are pressed or squeezed into engagement with the diametrically opposed regions of the outermost of telescoped tubes to indent the tube so as to provide a fluid tight seal throughout 360° or the entire circumference of the telescoped tubes.

It is apparent that, within the scope of the invention, modifications and different arrangements may be made other than is herein disclosed, and the present disclosure is illustrative merely, the invention comprehending all variations thereof.

We claim:
1. A clamp construction adapted to embrace a circular cylindrically shaped member including, in combination, a clamping bolt formed with a semicircular portion and spaced parallel portions and a saddle means, said saddle means being formed of substantially identical sections of sheet metal wherein each section is formed with a substantially tubular portion and parallel web portions, said web portions being in contiguous positions and welded in fixed relation, said web portions having transversely coincident curved edge regions of not more than 180° and of a curvature substantially the same as that of the semicircular portion of the clamping bolt, the parallel web portions of each section having axially displaced extensions at the regions of transition of the web portions into the tubular portions which overlap the semicircular portion of the clamping bolt, the radii of the semicircular configurations of the clamping bolt and saddle web portions being substantially coincident with the exterior surface of the cylindrically shaped member with which the clamp is used.

2. A clamp construction adapted to embrace circular cylindrically shaped telescoped members including, in combination, a clamping bolt formed with a semicircular portion and spaced parallel portions and a saddle means, said saddle means formed of substantially identical sections of sheet metal wherein each section is formed with a substantially cylindrical tubular portion and integral contiguous web portions of different lengths, the web portions of greater length being overlapped in assembly and welded together and the contiguous portions of each section welded together, said web portions having coincident curved edge regions of not more than 180° and of a curvature substantially the same as that of the semicircular portion of the clamping bolt, said web portions having axially displaced extensions at the regions of transition of the web portions into the tubular portions which overlap the semicircular portion of the clamping bolt, the radii of the semicircular configurations of the clamping bolt and saddle web portions being substantially coincident with the exterior surface of the outer of the telescoped members.

References Cited in the file of this patent
UNITED STATES PATENTS

| | | |
|---|---|---|
| 124,897 | Honsinger | Mar. 26, 1872 |
| 2,175,662 | Guernaschell | Oct. 10, 1939 |
| 2,719,345 | Riker | Oct. 4, 1955 |
| 2,911,239 | Marzolr | Nov. 3, 1959 |
| 2,959,834 | Graham et al. | Nov. 15, 1960 |